United States Patent [19]

Goldsworthy

[11] Patent Number: 4,763,639

[45] Date of Patent: Aug. 16, 1988

[54] DISPOSABLE COVER FOR AN OUTDOOR BARBECUE GRILL

[75] Inventor: Kenneth M. Goldsworthy, Drayton Plains, Mich.

[73] Assignee: Alex Rhodes; Southfield, Mich.

[21] Appl. No.: 902,097

[22] Filed: Aug. 27, 1986

Related U.S. Application Data

[63] Continuation of Ser. No. 710,321, Mar. 11, 1985, abandoned.

[51] Int. Cl.[4] .............................................. A47J 37/00
[52] U.S. Cl. ................................ 126/25 R; 126/39 M; 44/544; 99/446
[58] Field of Search ............... 126/25 R, 214, 39 M, 126/221; 99/481, 483, 446; 44/1, 6, 14, 24, 38, 40, 41, 10 C, 10 B, 150, 3 B, 3, 1 C, 1 E; 252/305, 315.011, 318

[56] References Cited

U.S. PATENT DOCUMENTS

| 2,184,666 | 12/1939 | Fredericks | 431/288 X |
| 2,187,053 | 1/1940 | Pratt | 431/288 X |
| 2,803,242 | 8/1957 | Hammond, Jr. | |
| 2,806,227 | 9/1957 | Arbetter | 126/39 M |
| 2,967,023 | 1/1961 | Huckabee | 126/25 R |
| 3,127,828 | 4/1964 | Fine | |
| 3,385,282 | 5/1968 | Lloyd | |
| 3,490,123 | 1/1970 | Clark | 126/39 M |
| 3,555,994 | 1/1971 | Nemetz | 126/39 M |
| 3,647,403 | 3/1972 | Davis, Jr. | 44/6 |
| 3,709,700 | 1/1973 | Ross | 44/41 X |
| 4,102,653 | 7/1978 | Simmons et al. | 44/10 B X |
| 4,394,410 | 7/1983 | Osrow et al. | 99/446 |

*Primary Examiner*—Larry Jones
*Attorney, Agent, or Firm*—Rhodes and Boller

[57] ABSTRACT

A disposable cover for covering the cooking surface of an outdoor charcoal fueled barbecue grill and directing the quantity and flow of air beneath the cover when it is placed onto the cooking surface of said grill. The cover is made from a manually formable material having a plurality of perforations arranged in rows, the perforations of each of the rows being in staggered radial relationship with the perforations of adjacent rows. The outward facing side of the cover has a highly polished shiny reflective metallic finish for reducing the radiant heat transfer from the grill and the inwardly facing surface has a coating of aromatic wood chips and a bonding agent for enhancing the flavor of food cooked on the grill.

5 Claims, 1 Drawing Sheet

U.S. Patent    Aug. 16, 1988    4,763,639
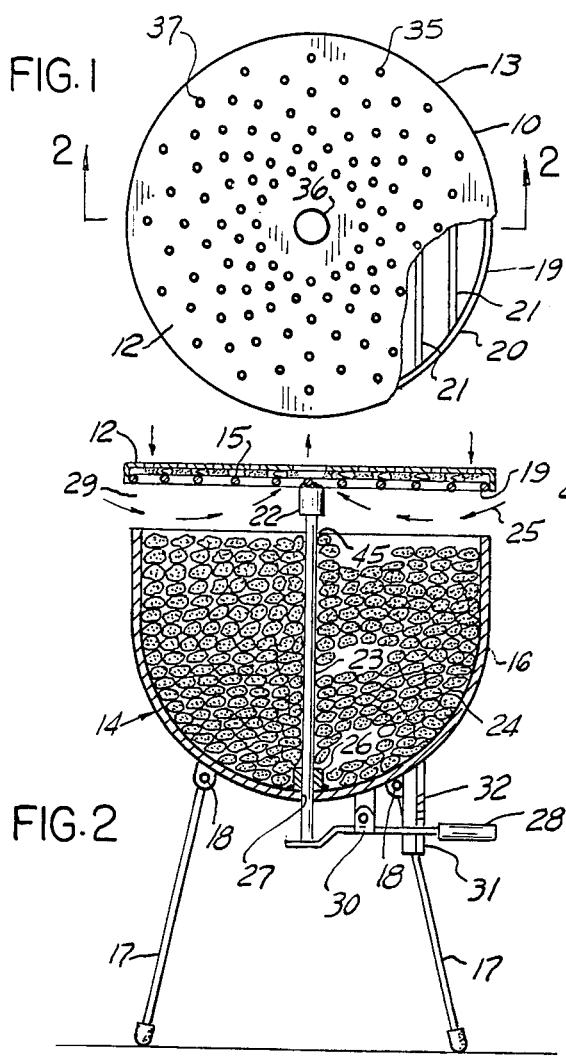
FIG. 1
FIG. 2
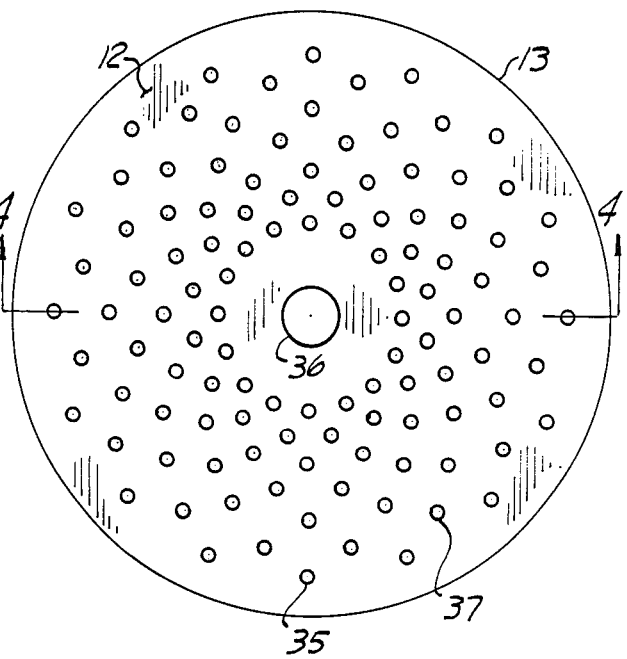
FIG. 3
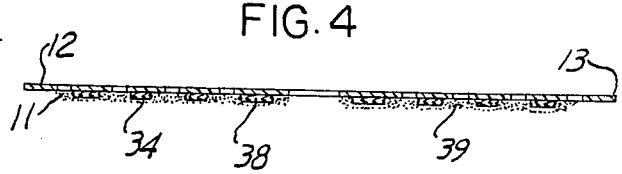
FIG. 4
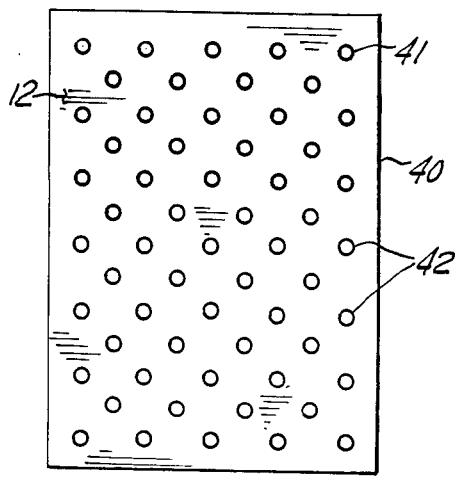
FIG. 5
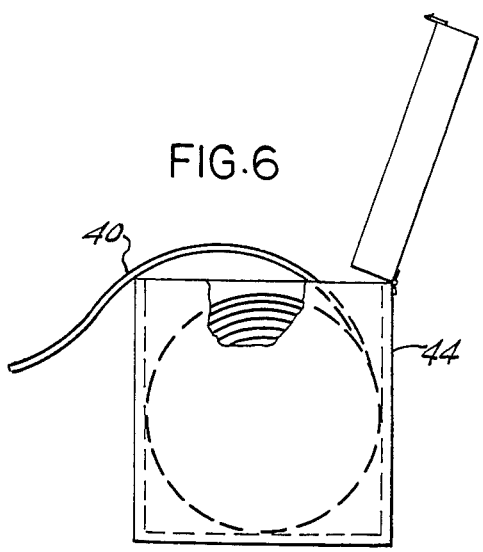
FIG. 6

4,763,639

DISPOSABLE COVER FOR AN OUTDOOR BARBECUE GRILL

CROSS-REFERENCE TO RELATED APPLICATION

This application is a continuation of serial number 06/710,321, filed Mar. 11, 1985, now abandoned.

BACKGROUND OF THE INVENTION

Of the numerous frustrations encountered when cooking food on an outdoor charcoal fueled barbecue grill, perhaps the most common ones are: (1) failures to ignite the charcoal fuel, (2) a long delay in bringing the coals up to a proper "cooking heat", (3) body injuries or property damage during a sudden gust of wind from the emission of hot cinders onto the person or some readily flammable object, (4) spontaneous burst of flame from drippings of fat onto the heated barbecue coals, and (5) food adulteration from charcoal starter additives or overheating. With the foregoing in mind, it will be appreciated that a product which reduces or eliminates these vexatious events would add to the delight of and be most welcomed by the epicureans of the charcoal grill.

SUMMARY OF THE INVENTION

The present invention is related to outdoor charcoal fueled barbecue grills and more particularly to a coated perforated cover which is placed on top of the cooking surface of a charcoal grill. The cover is comprised of a perforated sheet of manually formable foil having an aromatic coating on one side of the sheet to enhance food quality and a highly polished shiny finish on the other side of the sheet.

One feature of the invention is a staggered pattern of perforations through the cover which direct the flow of air during the ignition of the charcoal fuel.

Another feature is the aromatic coating on the inward facing side of the cover which enhances the flavor of food prepared on a grill.

Another feature is the highly polished finish on the outward facing side of the cover which reduces radiant heat transfer from the grill by lowering the emissivity of the outward side of the sheet.

It is the general object of the present invention to improve the process of preparing food on charcoal grills.

It is a particular object of the present invention to reduce the difficulty of igniting a charcoal fuel.

It is another particular object in addition to the foregoing particular object to reduce the time for bringing a charcoal fuel up to the proper "cooking heat".

It is another particular object in addition to the foregoing particular objects to economize in the use of charcoal and starter fluid for preparing food on charcoal grills.

It is another particular object in addition to the foregoing particular objects to enhance the flavor of foods which are prepared on charcoal grills.

It is another particular object in addition to the foregoing particular objects to reduce injuries and property damage associated with the use of charcoal grills.

Additional objects, features and benefits of the invention will become apparent from the ensuing description and accompanying drawings which disclose the invention in detail. A preferred embodiment and the manner of using the invention are disclosed in accordance with the best mode contemplated in carrying out the invention and the subject matter in which exclusive property rights are claimed is set forth in the numbered claims at the conclusion of the description.

BRIEF DESCRIPTION OF THE DRAWINGS

FIG. 1 is a plan view of a barbecue grill with the present invention applied to the cooking surface of the grill.

FIG. 2 is a side elevational view of the barbecue grill shown in FIG. 1.

FIG. 3 is the plan view of the barbecue cover shown in FIG. 1 drawn to an enlarged scale.

FIG. 4 is a cross-sectional view drawn to an enlarged scale taken on the line 4—4 of FIG. 3.

FIG. 5 is a plan view of an alternate embodiment of the invention drawn to an enlarged scale.

FIG. 6 is a side elevational view of a dispenser for a the embodiment shown in FIG. 5.

DESCRIPTION OF THE PREFERRED EMBODIMENT

Referring now to the drawing wherein like numerals refer to like and corresponding parts throughout the several views, the present invention of a barbecue cover 13 shown therein comprises a thin perforated sheet of a manually formable metallic foil 10 having an aromatic coating 11 on one side of the foil 10 and a highly polished shiny finish on the other side 12 of the foil.

With reference to to FIGS. 1 through 4, inclusive, in the particular embodiment disclosed therein, the cover 13 is pre-cut in a circular shape to conform to a barbecue grill 14 and completely covers the cooking surface 15 of the grill 14. The barbecue grill 14 which is conventional is comprised of a semi-spherical shaped fire box 16 supported on three tubular legs 17, each leg 17 being attached at the upper end portion 18 thereof to the outer side of the fire box 16. Immediately above the fire box 16 is a wire cooking panel 19 consisting of a circular wire outer rim 20 and a plurality of parallel spaced wires 21 which adjoin and subtend the wire rim 20. The upper portions of outer rim 20 and wires 21 comprise the cooking surface 15 of the grill 14.

The center portion of the cooking panel 19 is a downward opening tubular hub 22 which receives a slender circular wire rod 23 that supports the cooking panel 19. The downward opening hub 23 of the cooking panel 19 is detachable from the support rod 23 to allow the removal of the cooking panel 19 during loading of the fire box 16 with the charcoal fuel 24. The lower end portion of the support rod 23 is slideably supported in an upward extending tubular sleeve 26 which is fixedly attached to the lower center portion of the fire box 16 and aligned with the hub 22 of the cooking panel 19. The lower sleeve 26 is aligned with an aperture 27 in the fire box 16 through which the support rod 23 extends.

The lower end of the support rod 23 bears on the end portion of a hand lever 28 which moves the support rod 23 vertically upward and downward to adjust the vertical space 29 between the cooking panel 19 and fire box 16. The hand lever 28 is pivotally mounted to a downwardly extending bracket 30 which is fixedly attached to the outer side of the fire box 16. Between the adjusting lever pivot bracket 30 and the outer end of the hand lever 28 is a second downwardly extending adjusting bracket 31 which is also fixedly attached to the outer side of the fire box 16. The second bracket 31 has notches 32 which receive and position the adjusting lever 23.

Referring now to FIG. 3, the barbecue cover 13 is preferably made from a thin sheet of manually formable aluminum or copper foil 10 having a thickness which is preferably of about one to four one-thousandths (0.001"-0.004") of an inch. The outward facing side 12 of the cover 13 has the highly polished shiny finish which reduces radiant heat transfer from the grill 14 by lowering the emissivity of the outward facing side 12. The inward facing side 34 has the aromatic coating 11 which will be hereinafter more fully described.

As shown in FIG. 1, at the center of the barbecue cover 13 disclosed therein is an arrangement of perforations 35 which consist of a central perforation 36 and a plurality of perforations 37 arranged in concentric circular rows which extend radially outwardly to the outer margin of the cover 13. Although the perforations 36 and 37 are round in shape, it will be apparent that other shapes such as rectangles can be used in practicing the invention.

The perforations 37 of adjacent circular rows are in staggered radial relationship. The radial staggering of the perforations 37 increases the tear strength of the cover 13 without limiting the sizes and quantity of perforations 37.

The aromatic coating 11 on the inward facing side 12 of the cover 13 contains particles or chips of an aromatic substance 38, such as, hickory or cherry wood, and a bonding agent 39. One preferred type of bonding agent 39 is the soft white translucent mineral wax called paraffin which is commonly used for making tapers and candles and sealing jars of fruits and preserves. One benefit of paraffin is that it is devoid of taste and smell. Another benefit is that during combustion of the paraffin, water vapor is produced which tends to prolong the aroma of an aromatic wood by reducing the rate of burning of the aromatic wood 38. In addition to paraffin, other bonding agents, such as, animal based adhesives may be used for bonding the particles or chips of the aromatic substance 38 to the inward facing side 34 of the cover 13.

With reference to FIG. 5, an alternate embodiment 40 is shown therein of rectangular shape having perforations 41 arranged in staggered relationship between adjacent straight parallel rows 42. It will be appreciated that this embodiment can be a segment sheared from a roll of material stored in a conventional type dispenser 44 as shown in FIG. 6 and is adaptable to a variety of shapes of barbecue grills.

Referring now to FIG. 2, in the preferred method of using the invention a small quantity of a highly combustible substance, such as, wood twigs or charcoal lighter fluid is placed onto the portion 45 of the charcoal fuel 24 in the center of the fire box 16. The perforated cover 13 is placed on top of the cooking panel 19 and the cooking panel 19 is elevated slightly with the hand lever 23 so as to provide the small gap 29 between the cooking panel 19 and fire box 16. Thereafter, the combustible substance at the center of the fire box 16 is ignited.

As the combustion proceeds, a hot gaseous mixture of air and the products of combustion are driven upward through the perforations 36 and 37 in the center of the cover 13 and a flow pattern as shown by the arrows in FIG. 2 is established whereby outside air is caused to enter into the space beneath the cover 13, thence radially inward towards the burning fuel 24 and thence upwardly and outwardly through the central perforations 36 and 37 of the cover 13. As the air flows radially inwardly towards the burning fuel, the ignition of the fuel 24 moves radially outwardly. It will be observed that fuel 24 is conserved and ignition is promoted by the directed convection and reduced radiation heat transfer provided by the barbecue cover 13.

As the ignition of the fuel 24 proceeds radially outwardly, a rich aroma from the aromatic coating 11 on the inward facing side 34 of the cover 13 is released through the perforations 36 and 37 of the cover 13.

One of the main attractions of barbecued foods is the flavor imparted by drippings burning and smoking from superheated coals. However, heretofore it has been nearly impossible to control this process without the usual disastrous "flame-ups" wherein burning dripping fat creates excessive heat and burns the food. The present invention eliminates this problem by distributing the drippings, reducing direct contact of the drippings with the burning coals 24 and controlling the flow of air onto the drippings.

From the foregoing description it will be appreciated that the barbecue cover 13 provides a more uniform cooking temperature over the cooking surface by spreading the heat. Also, the present invention provides a means for regulating the cooking temperature by adjusting the cooking panel 19 with the applied cover 13 up and down to regulate the flow of air to the fuel 24.

Furthermore, by shielding the burning coals 24 and surrounding ashes from prevailing winds, the cover 13 protects the grill attendant and surrounding objects from the threat of hot cinders.

Although but two specific embodiments of this invention have been shown and described herein, it will be understood that various changes including size, shape, arrangement and details of parts of the invention may be made without departing from the spirit of my invention and it is not my intention to limit its scope other than by the terms of the appended claims.

I claim:

1. A disposable cover for covering the cooking surface of an outdoor charcoal fueled barbecue grill comprising an aromatic coating substantially covering one side of said cover, said coating having particles of an aromatic substance and a bonding agent for adhering said particles to the cover.

2. The disposable cover recited in claim 1 wherein said aromatic substance is particles of wood.

3. The disposable cover recited in claim 1 wherein said bonding agent is the soft white transluscent mineral called paraffin.

4. A disposable cover for covering the cooking surface of an outdoor charcoal fueled barbecue grill comprising:
   (a) a thin sheet made from a manually formable metallic foil pre-cut to conform to the shape of the cooking surface of a barbecue grill, said sheet having a defined arrangement of perforations for directing the quantity and flow of air beneath the cover when it is placed onto the cooking surface of a charcoal grill;
   (b) an aromatic coating substantially completely covering one side of said cover, said coating comprising particles of an aromatic wood and a bonding agent for adhering said particles to the cover.

5. In a disposable cover for covering the cooking surface of an outdoor charcoal fueled barbecue grill of the type made from a perforated manually formable foil, the improvement which comprises an aromatic coating on one side of said cover, said coating having particles of an aromatic substance and a bonding agent for adhering said particles to the cover, and a shiny reflective metallic finish on the other side of said cover.

* * * * *